(No Model.)
A. T. MOATS.
MINER'S PICK.
No. 318,279. Patented May 19, 1885.
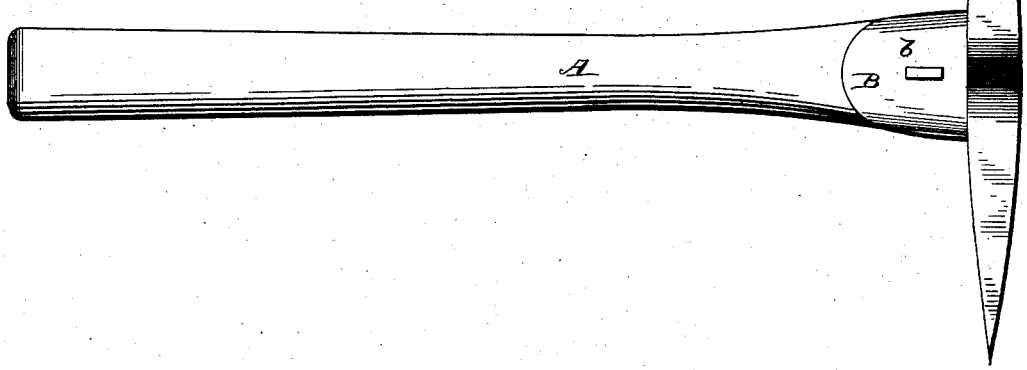
Fig. 1.
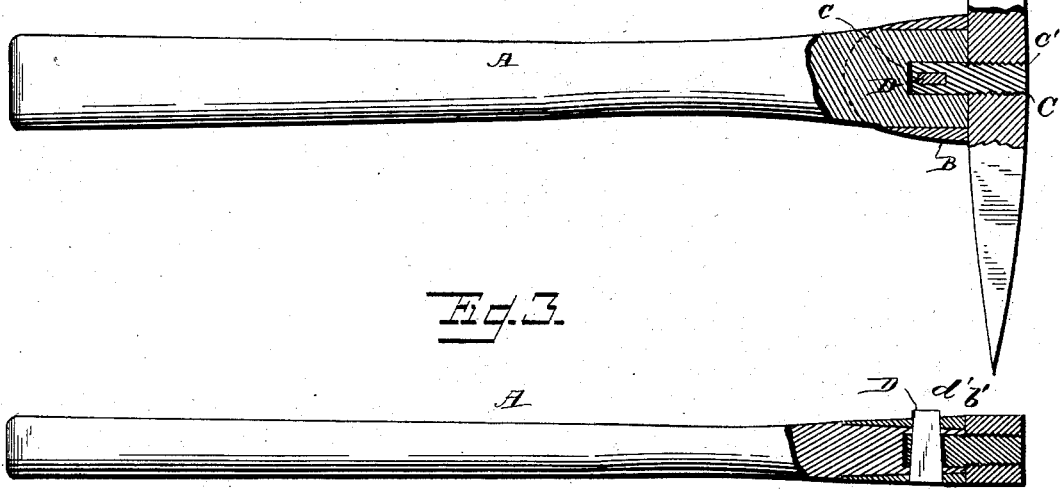
Fig. 2.
Fig. 3.
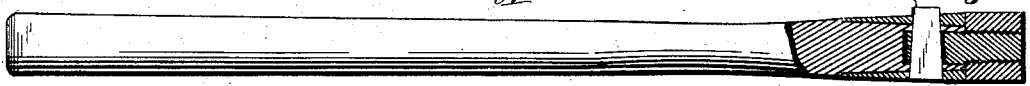
WITNESSES
F. L. Ourand
E. H. Johnson
Andrew T. Moats
INVENTOR
Attorney

UNITED STATES PATENT OFFICE.

ANDREW T. MOATS, OF PLEASANTVILLE, IOWA.

MINER'S PICK.

SPECIFICATION forming part of Letters Patent No. 318,279, dated May 19, 1885.

Application filed March 12, 1885. (No model.)

*To all whom it may concern:*

Be it known that I, ANDREW T. MOATS, a citizen of the United States of America, residing at Pleasantville, in the county of Marion and State of Iowa, have invented certain new and useful Improvements in Picks; and I do hereby declare the following to be a full, clear, and exact description of the invention, such as will enable others skilled in the art to which it appertains to make and use the same, reference being had to the accompanying drawing, and to letters or figures of reference marked thereon, which form a part of this specification.

My invention relates to certain new and useful improvements in picks; and it consists in providing the pick with a screw-threaded eye for the reception of the end of a screw-threaded shank or bolt, which is secured to the handle by means of a key which passes through the handle and the sides of a socket, as will be hereinafter fully set forth, and specifically pointed out in the claims.

In the accompanying drawings, which illustrate my invention, Figure 1 is a side view, and Figs. 2 and 3 are sectional views.

A represents the handle of the pick, which is of the usual construction, and is provided at its end with a metallic socket, B, which is shrunk thereon, said socket being provided on opposite sides with slots $b\ b$. The end of the handle is provided at its central portion with a recess, $c$, which is for the reception of the shank C, one end of which is rectangular in cross-section, while the other is screw-threaded, as shown at $c'$. The rectangular end of the shank is provided with a transverse slot, $b'$, through which passes a wedge-shaped key, D, the slot in the shank C being of greater length than the width of the key, so that said key, when its end $d'$ is flush with the socket the shank C may have a slight longitudinal play.

E represents the pick-blade, which is flat upon its side which abuts against the end of the socket.

To attach the pick-blade to the handle the shank is first loosely secured to the handle by passing the key through the openings in the sides of the socket and the opening in the shank. By this construction, when the pick-blade is secured to the shank by turning the parts upon each other, the shank may be further tightened by striking upon the large end of the wedge, the smaller end being upset, so as to retain the parts in position.

I claim—

1. The combination, with a pick-handle, of a shank attached to the end thereof by means of a transverse pin and having a threaded portion projecting beyond the end of said handle, and a pick-blade having a screw-threaded eye to engage said projecting portion, so that said blade may be secured in position on the handle, with a bearing against the end thereof, substantially as set forth.

2. The combination, with a pick-handle, of a socket, B, embracing one end of the same and provided with openings $b$, a recess formed in the end of the handle for the reception of a shank, having an opening registering with the openings $b$, and with a threaded portion projecting beyond the end of said handle, a wedge-shaped key passing through said socket and shank openings, and a pick-blade having a screw-threaded eye for the engagement of the projecting portion of the shank to secure said blade relative to said handle, so as to have a bearing against the end of the same and the socket thereof, substantially as set forth.

In testimony whereof I affix my signature in presence of two witnesses.

ANDREW T. MOATS.

Witnesses:
JOS. MCCLELLAND,
C. M. ISHAM.